(12) United States Patent
Soares

(10) Patent No.: US 6,212,292 B1
(45) Date of Patent: Apr. 3, 2001

(54) CREATING AN IMAGE OF AN OBJECT WITH AN OPTICAL MICROSCOPE

(75) Inventor: Schubert Soares, Cañon Country, CA (US)

(73) Assignee: California Institute of Technology, CA (US)

( * ) Notice: Subject to any disclaimer, the term of this patent is extended or adjusted under 35 U.S.C. 154(b) by 0 days.

(21) Appl. No.: 09/111,919

(22) Filed: Jul. 8, 1998

(51) Int. Cl.$^7$ ........................................ G06K 9/00
(52) U.S. Cl. ........................ 382/141; 250/306; 257/80; 257/449; 356/237.2
(58) Field of Search ...................... 382/141, 145–149, 382/152, 218, 219; 257/80, 449, 451; 250/235, 234, 306, 307, 311; 356/237.2

(56) References Cited

U.S. PATENT DOCUMENTS

| | | | |
|---|---|---|---|
| 4,894,540 | * | 1/1990 | Komatsu ............................. 250/307 |
| 4,987,461 | | 1/1991 | Bureck et al. ......................... 257/80 |
| 5,640,237 | * | 6/1997 | Esrig et al. .......................... 356/237 |
| 5,684,298 | | 11/1997 | O'Connor et al. ................. 250/231.1 |
| 5,726,739 | * | 3/1998 | Hayata ................................... 355/67 |

OTHER PUBLICATIONS

"A High Resolution Si Position Sensor", K. A. M. Scott, et al., Appl. Phys. Lett. 62 (24), Jun. 14, 1993.

"Photoconductive Gain in a Schottky Barrier Photodiode", Schubert F. Soares, Jpn. J. Appl. Phys. vol. 31 (1992) pp. 210–216.

"Picometre displacement tracking of an optical beam in a silicon schottky barrier sensor", S.D. O'Connor, et al., Electronics Letters Oct. 17, 1994 vol. 30, No. 22.

"A Simple High–Speed Si Schottky Photodiode", B.W. Mullins, et al., IEEE Photonics Technology Letters, vol. 3, No. 4, Apr. 1991.

* cited by examiner

Primary Examiner—Bhavesh Mehta
(74) Attorney, Agent, or Firm—Fish & Richardson P.C.

(57) ABSTRACT

A near-field scanning optical microscope uses short-circuit current or open-circuit voltage signals from a photosensor to generate and display an image of an object. The photosensor includes two pairs of Schottky-barrier contacts positioned on the photosensor's semiconductor surface along two orthogonal axes. Together the contact pairs define a gap, within which the object to be viewed is placed. When the microscope scans a beam of light over the gap, the photosensor produces two signals, each of which indicates the position of the light beam between one of the contact pairs. The microscope includes a computer that receives the signals from the photosensor during two scans, one conducted without the object on the surface of the photosensor (the "background" scan), and the other conducted with the object in place (the "object" scan). A computer uses the signals to produce a background scan dataset and an object scan dataset, both of which are processed to remove the effects of the light beam's Gaussian profile. The computer then subtracts the object scan dataset from the background scan dataset to produce raster image data, which it uses to generate an image of the object on a display device.

32 Claims, 6 Drawing Sheets

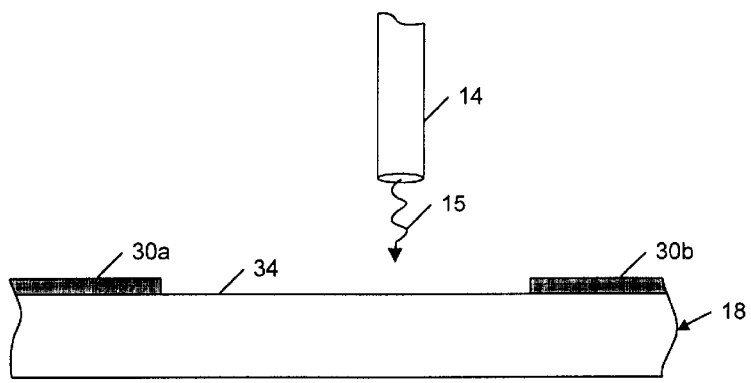
FIG. 3A
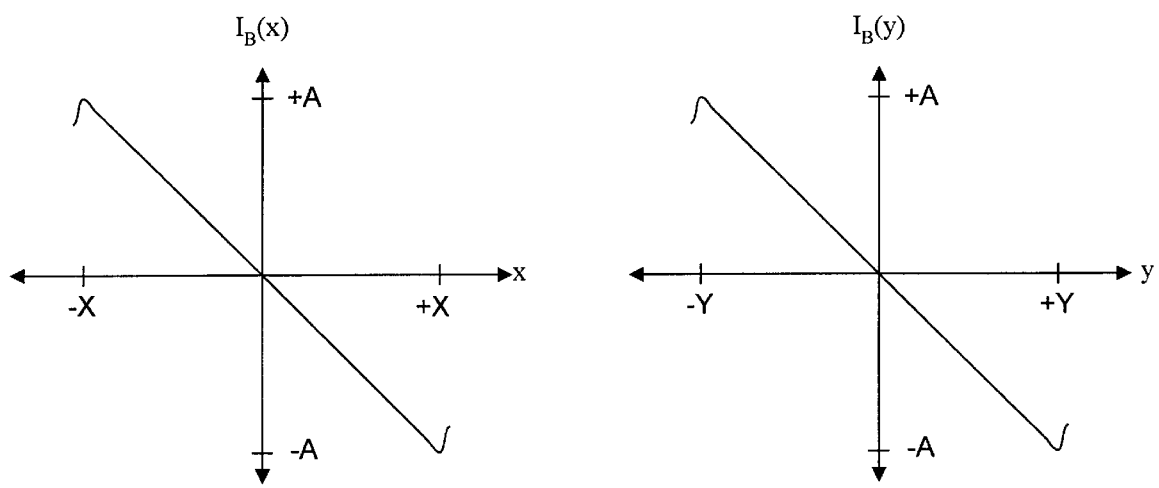
FIG. 3B
FIG. 3C

CREATING AN IMAGE OF AN OBJECT WITH AN OPTICAL MICROSCOPE

BACKGROUND

The invention relates to observing sub-microscopic objects.

Optical microscopes are used to observe, e.g., microscopic variations on the surfaces of objects, including the surfaces of semiconductor materials onto which conductive or dielectric materials have been deposited. One type of optical microscope, a near-field scanning optical microscope (NSOM), uses an optical fiber with a fine tip to illuminate an object in the near-field, i.e., with the tip and the object separated by a distance less than the diameter of the tip. A photosensor then detects spatial variations in light transmitted through or reflected from the object, producing an output current in proportion to the intensity of the detected light. A rastering device, e.g., a scanning stage, is used to move the tip along the object and thus to generate an image illustrating the intensity of light across the surface area of the object.

The resolution of an image generated with an NSOM depends largely on the dimensions, geometry, and position of the tip. Resolution also depends on the size of the object and the distance between the tip and the object. Complex tip conditioning techniques have been developed to produce fibers with tips as small as tens of nanometers in diameter. However, such tips often must be processed or otherwise reconditioned before each scan of an object. Standard NSOMs also employ complex dithering techniques to ensure appropriate spacing between the fiber tip and the sensor surface.

SUMMARY OF THE INVENTION

Recognition of the above led the inventor to present an optical imaging technique that involves relatively simple tip preparation and positioning and relatively simple object image generation.

In one aspect, the invention relates to an optical microscope for use in creating an image of an object. The optical microscope includes a light source operable to produce a beam of light, an actuator coupled to the light source to scan the beam of light over a surface on which the object is to be placed, and processing circuitry. The processing circuitry receives a background scan signal when the beam of light strikes the surface during a background scan conducted without the object placed on the surface, creates a background scan dataset indicating a value of the background scan signal at each of multiple positions on the surface, receives an object scan signal when the beam of light strikes the surface during an object scan conducted with the object placed on the surface, creates an object scan dataset indicating a value of the object scan signal at each of the multiple positions on the surface, and derives image data from the background scan dataset and the object scan dataset for use in creating the image of the object.

In some implementations, the processing circuitry may subtract the object scan dataset from the background scan dataset to derive the image data. The beam of light may have a known beam profile and the processing circuitry may process the background scan dataset and the object scan dataset to account for the beam profile, e.g., by deconvolving the beam profile from the background scan dataset and the object scan dataset.

In other implementations the processing circuitry may receive an additional background scan signal during the background scan and an additional object scan signal during the object scan. The background scan signals may indicate motion of the light beam in two different directions over the surface during the background scan, and the object scan signals may indicate motion of the light beam in two different directions over the surface during the object scan. The processing circuitry may add the background scan signals before creating the background scan dataset and may add the object scan signals before creating the object scan dataset.

In other implementations, the optical microscope may include a fiber connected to the light source to deliver the beam of light to the surface on which the object is to be placed. The fiber may be positioned so that the surface lies in the near-field of the light emitted by the fiber. The optical microscope also may include a photosensor having a semiconductor surface that serves as the surface on which the object is to be placed. The photosensor may include one or more MSM diodes. The optical microscope may include a display device capable of displaying the image.

In another aspect, the invention relates to a method for use in creating an image of an object in an optical microscope. A beam of light is scanned over a surface on which the object is to be placed, and a background scan signal is received. After the object has been placed on the surface, the beam of light again is scanned over the surface, and an object scan signal is received. A background scan dataset and an object scan dataset are created. The background scan dataset indicates a value of the background scan signal at each of multiple positions on the surface, and the object scan dataset indicates a value of the object scan signal at each of the multiple positions on the surface. Image data then is derived from the background scan dataset and the object scan dataset for use in creating the image of the object.

In still another aspect, the invention relates to a computer program product embodied on a tangible storage medium and capable for use in creating an image of an object in an optical microscope. The program includes executable instructions that enable a computer to receive a background scan signal when a beam of light strikes a surface on which the object is to be placed during a background scan conducted without the object placed on the surface, create a background scan dataset indicating a value of the background scan signal at each of multiple positions on the surface, receive an object scan signal when the beam of light strikes the surface during an object scan conducted with the object placed on the surface, create an object scan dataset indicating a value of the object scan signal at each of the multiple positions on the surface, and derive image data from the background scan dataset and the object scan dataset for use in creating the image of the object.

Each implementation of the invention may provide any one or more of several advantages. Microscopic objects may be observed through a "tipless" optical microscope, i.e., a microscope for which relatively little or no tip preparation is necessary. The "tipless" nature of the optical imaging technique simplifies the observation process and reduces the cost of keeping and using the microscope. The optical microscope may be used to observe objects at a resolution of several microns or less even when the microscope's tip is much larger. The resolution of the microscope relies primarily on the resolution of the photo-sensor, which is relatively easy and inexpensive to manufacture.

The invention also allows for the use of photosensors that detect the tip's z-position, i.e., the distance between the tip and the photosensor. A relatively simple digital signal and image processing technique may be used to create images of objects.

Other embodiments and advantages will become apparent from the following description and from the claims.

BRIEF DESCRIPTION OF THE DRAWINGS

FIG. 3A is a side view of an optical fiber scanning light over a photosensor.

FIGS. 3B and 3C are graphs showing output signals generated by the photosensor as the optical fiber scans across the photosensor in the x-direction and in the y-direction, respectively.

DETAILED DESCRIPTION

Figure 1:
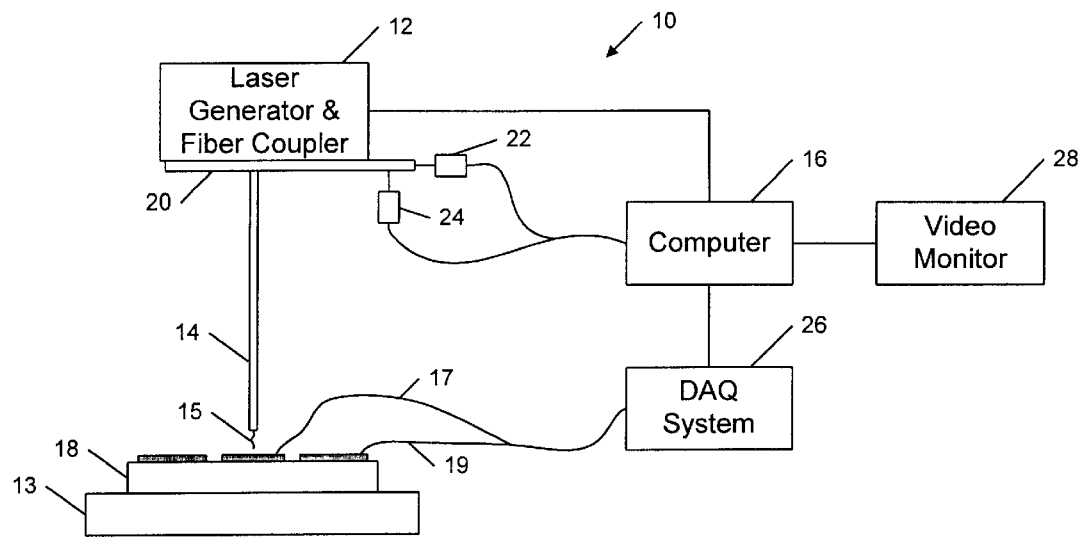
FIG. 1 is a schematic view of an optical microscope embodying the invention.

Referring to FIG. 1, an optical microscope 10 embodying the invention includes a light source, such as a diode laser 12, coupled to an optical fiber 14. The optical fiber 14, which typically is held stationary by a standard fiber holder, such as a rigid tube, directs a beam of light 15 from the laser 12 onto the semiconductor surface of a special photosensor, such as a metal-semiconductor-metal ("MSM") diode photosensor 18, mounted on a stage 13. The optical fiber may be any commercially-available single-mode fiber, such as a quartz-fused silica fiber. Another stage 20 driven, e.g., by piezo-ceramic actuators 22, 24 "scans" the optical fiber 14 in two dimensions over the surface of the photosensor 18, which holds an object to be viewed. The stage 20 also positions the optical fiber 14 vertically so that the photosensor 18 lies in the near-field of the light 15 emitted by the fiber 14. A processing system, such as a Windows-based, Unix-based, or Macintosh computer 16, provides control signals to the laser 12, the piezo-ceramic actuators 22, 24, and a data acquisition (DAQ) system 26.

Two wires 17, 19 connected to the photosensor 18 deliver two short-circuit current or open-circuit voltage signals from the photosensor 18 to the DAQ system 26. The amplitudes of these signals are substantially proportional to the relative position of the light beam 15 on the photosensor's semiconductor surface, as discussed below. The DAQ system 26, which may include, e.g., a low-noise, medium gain amplifier coupled with either an analog-to-digital (A/D) converter or a nanovoltmeter, amplifies and digitally samples the two signals from the photosensor 18 at predetermined sampling periods and provides the digital samples to the computer 16.

For each sampling period, the computer 16 adds the two samples and stores the result, along with information indicating the position, or pixel location, of the light beam, in a storage device such as a random access memory ("RAM") device or a hard disk. The stored data and the corresponding pixel information together form raster data, which may be used to generate images of objects placed on the semiconductor surface of the photosensor 18.

The computer 16 creates and stores raster data for two different scans of the photosensor 18. During the first of these scans, the "background" scan, no object is located on the semiconductor surface of the photosensor 18, and the photosensor 18 provides two "objectless" reference signals as output. The raster data created from the reference signals is stored as a background scan dataset. During the second scan, the "object" scan, an object is located on the semiconductor surface of the photosensor 18, and the photosensor produces two output signals, or "object" signals, that differ from the reference signals. The raster data created from the object signals is stored as an object scan dataset. The computer then performs image signal processing on the background and object scan datasets to form raster image data for the object, as described below. The computer 16 may use the raster image data to display an image of the object on a video monitor 28.

Figure 2:
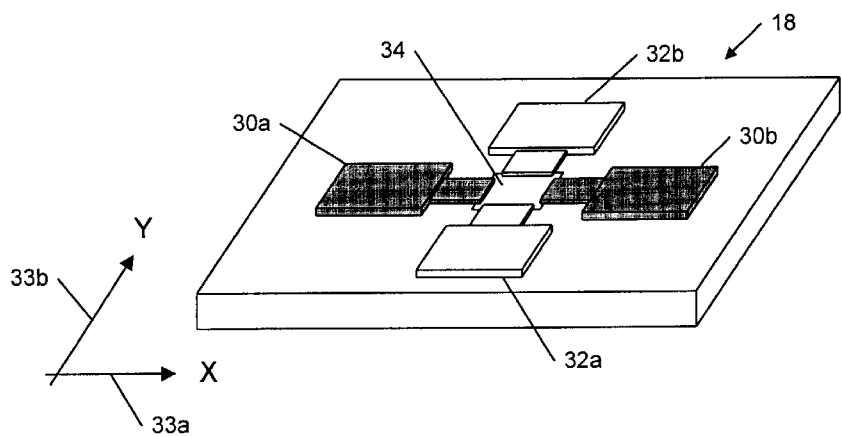
FIG. 2 is a perspective view of a photosensor used to detect light in the microscope of FIG. 1.

Referring also to FIG. 2, the photosensor 18 may be a high-resolution, displacement-type or position-type photosensor having two pairs of Schottky-barrier contacts 30a–b, 32a–b comprising Schottky photodiodes. The contacts 30a–b, 32a–b in each pair are separated by a two-dimensional gap 34, which typically has dimensions between 10 mm×10 mm and 1 mm ×1 mm. As the fiber 14 illuminates the gap 34, each contact pair 30a–b, 32a–b produces an output current, the amplitude of which indicates the relative position of the light beam between the contacts in the pair. Therefore, each contact pair 30a–b, 32a–b indicates the position of the light beam in one of two orthogonal dimensions, defined by an x-axis 33a and a y-axis 33b.

The resolution of the optical microscope depends primarily on the resolution of the photosensor 18. A photosensor with very fine resolution, e.g., a few microns or less, should be used. The structure, fabrication, and operation of suitable photosensors are described in the following U.S. patent and publications, all of which are incorporated by reference: (1) U.S. Pat. No. 4,987,461, issued Jan. 22, 1991; (2) S. D. O'Connor & S. F. Soares, "Picometre displacement tracking of an optical beam in a silicon Schottky barrier sensor," Electronics Letters, Vol. 30, No. 22, Oct. 27, 1994; (3) K. A. M. Scott et al., "A High resolution Si position sensor," Applied Physics Letters, Vol. 62, No. 24, Jun. 14, 1993; (4) S. F. Soares, "Photoconductive Gain in a Schottky Barrier Photodiode," Japanese Journal of Applied Physics, Vol. 31, Part 1, No. 2A, Feb. 1992; and (5) B. W. Mullins et al., "A Simple High-Speed Si Schottky Photodiode," IEEE Photonics Technology Letters, Vol. 4, No. 4, April 1991. The sensors described in these publications are relatively simple and inexpensive, e.g., as low as pennies per unit, to manufacture. The semiconductor surface of the sensor may be coated with a transmitting "passivation" layer, e.g., a layer of oxide or nitride film, to protect the surface from damage that might otherwise occur from repetitive use.

FIG. 3A shows a cross-section, along the x-axis, of the photosensor 18 during the background scan. FIG. 3B shows values of the reference signal produced during the background scan by the Schottky-barrier contact pair 30a–b lying along the x-axis of the photosensor. The contact pair produces an output current $I_B(x)$ that varies with the position x of the light beam. Each row of the scan begins with the beam positioned at one end of the gap 34, adjacent the first contact 30a (x=−X), and ends with the beam positioned at the other end of the gap 34, adjacent the second contact 30b (x=+X). At x=−X, the output current $I_B(x)$ has a value of approximately +A; at x=+X, the current has a value of approximately −A; and between the two ends, at x=0, the value of $I_B(x)$ is approximately zero. Likewise, FIG. 3C shows that the other contact pair 32a–b produces a similar reference signal $I_B(y)$ as the fiber scans from one end of the gap 34 to the other along the y-dimension. For each digital sampling period, the computer adds the x-dimension output current $I_B(x)$ and the y-dimension output current $I_B(y)$ to determine the total output current $I_B(x,y)$ at the corresponding beam position.

Figure 4A:
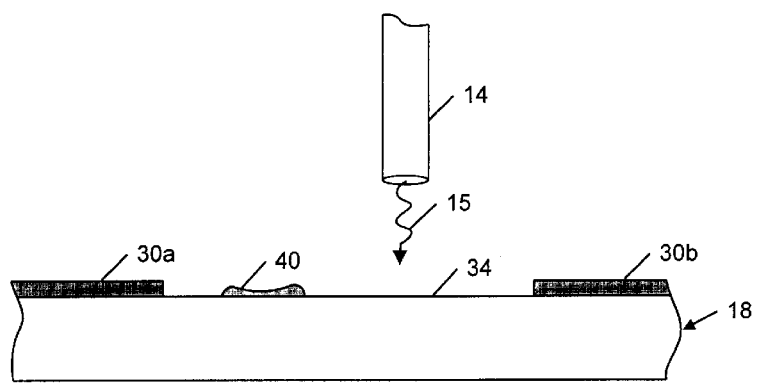
FIG. 4A is a side view of an optical fiber scanning light over a photosensor holding an object.
Figures 4B, 4C:
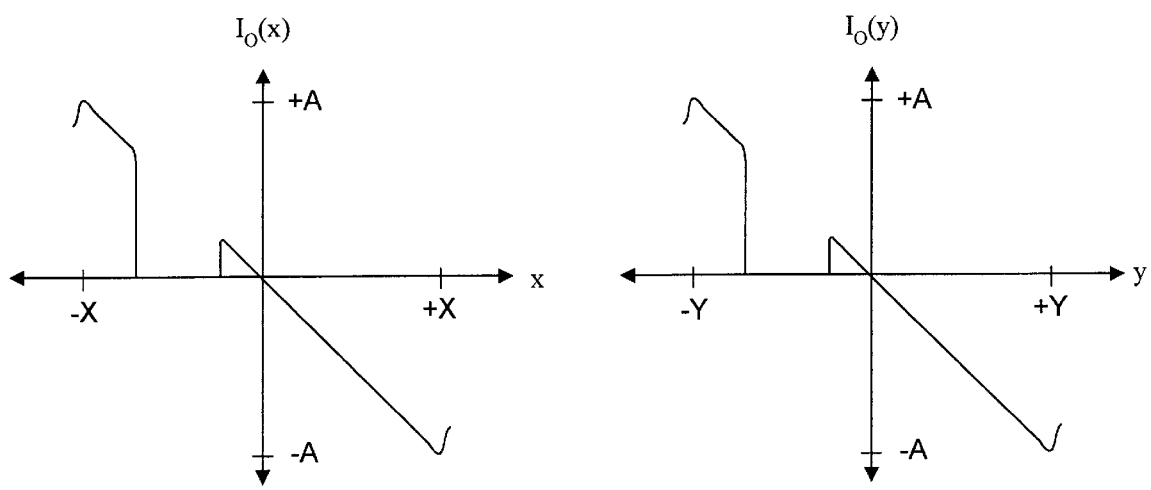
FIGS. 4B and 4C are graphs showing output signals generated by the photosensor as the optical fiber scans across the photosensor and the object in the x-direction and the y-direction, respectively.

FIGS. 4A, 4B and 4C show operation during an "object" scan conducted with an opaque object on the photosensor. With the object 40 resting on the surface of the photosensor 18, the contact pair 30a–b lying along the x-axis produces a current signal $I_O(x)$ which is similar to the reference signal $I_B(x)$ produced during the "background" scan, except in the areas where the object 40 shields the photosensor 18 from the light beam 15. When the beam 15 strikes the object 40, the object reflects or absorbs most of the light in the beam 15. As a result, the value of the output current $I_O(x)$ drops to near zero. Similarly, the contact pair 32a–b lying along the y-axis produces an output current $I_O(y)$ that is similar to the reference signal $I_B(y)$ produced during the "background" scan. As with the signal $I_O(x)$, the signal $I_O(y)$ drops to near zero when the object 40 shields the photosensor 18 from the light in the beam 15. As before, the computer adds the x-dimension output current $I_O(x)$ and the y-dimension output current $I_O(y)$ to determine the total output current $I_O(x,y)$ at the corresponding beam position.

If the object 40 is partially or fully transparent, the object does not prevent all light from reaching the semiconductor surface of the photosensor. As a result, the sensor's output current may not fall to zero when the beam is illuminating the object. Nevertheless, the sensor's output in this situation may be used to form a transmission mode image of the object.

Figure 5A:
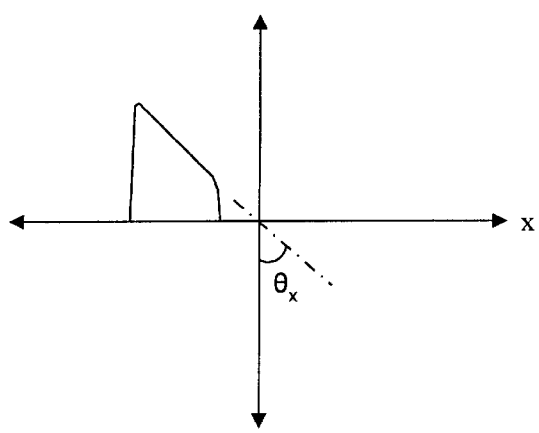
FIGS. 5A, 5B, 5C and 5D are graphs showing image signals that may be derived from the output signals of FIGS. 3B and 4B and FIGS. 3C and 4C, respectively.
Figure 5B:
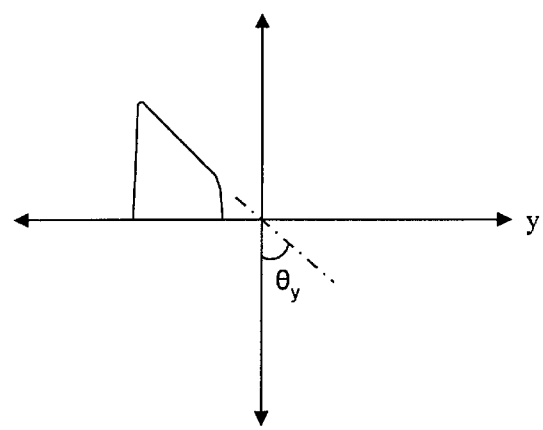
Figure 5C:
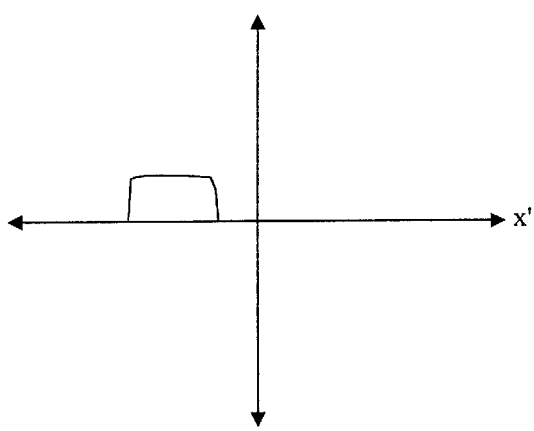
Figure 5D:
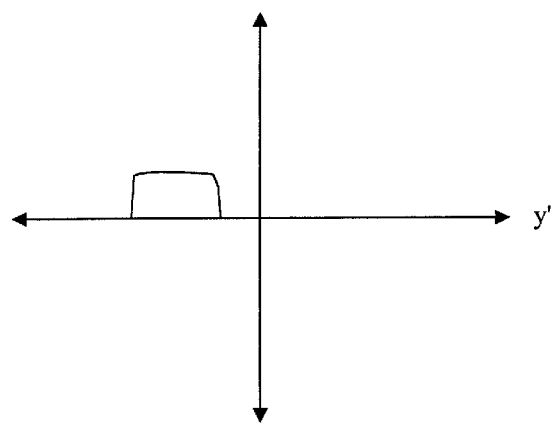

FIGS. 5A and 5B show that the computer can create image data $I_I(x,y)$ by subtracting, pixel by pixel, the "object" data $I_O(x,y)$ from the "background" data $I_B(x,y)$. FIGS. 5C and 5D show that the computer can improve the quality of the image data $I_I(x,y)$ by removing the slope inherent in the image data to "flatten" the resulting image. If the slope in the image data is linear, the computer can remove the slope by rotating the x-axis and the image signal axis $I_I(x)$ by the angle $\theta_x$ and by rotating the y-axis and the image signal axis $I_I(y)$ by the angle $\theta_y$. The angles $\theta_x$ and $\theta_y$ are defined by the slope of the image data on one hand, and by the image signal axis $I_I(x,y)$ on the other. The axes may be rotated by mapping each value x along the x-axis to a new value x', where $x'=x/\sin\theta_x$; by mapping each value y along the y-axis to a new value y', where $y'=y/\sin\theta_y$; and by mapping each value $I_I(x)$ and $I_I(y)$ to the new values $I_I'(x)=I_I/\cos\theta_x$ and $I_I'(y)=I_I(y)/\cos\theta_y$, respectively.

Figure 6A:
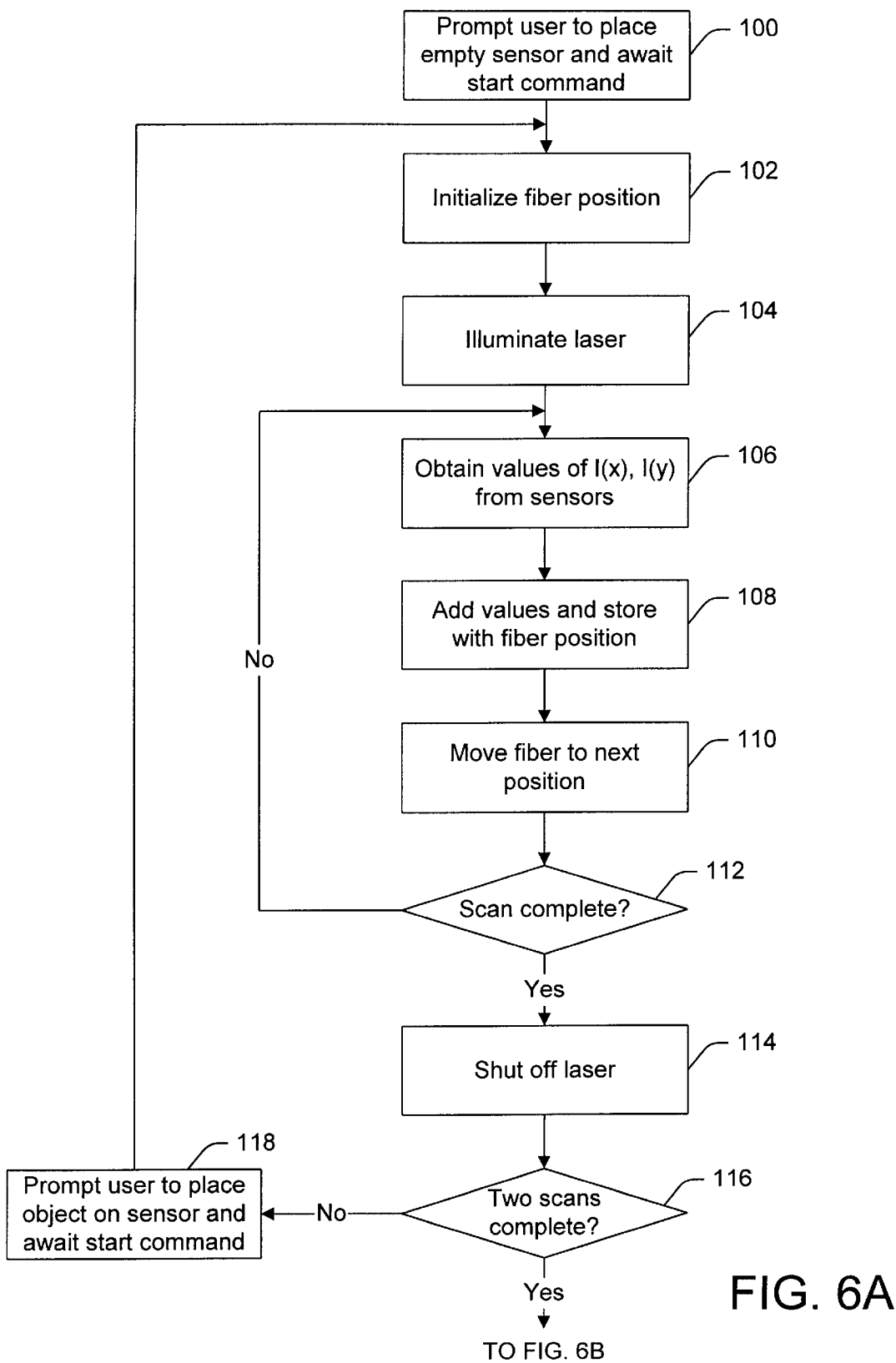
FIGS. 6A and 6B are a flowchart for creating an image of an object using the optical microscope of FIG. 1.
Figure 6B:
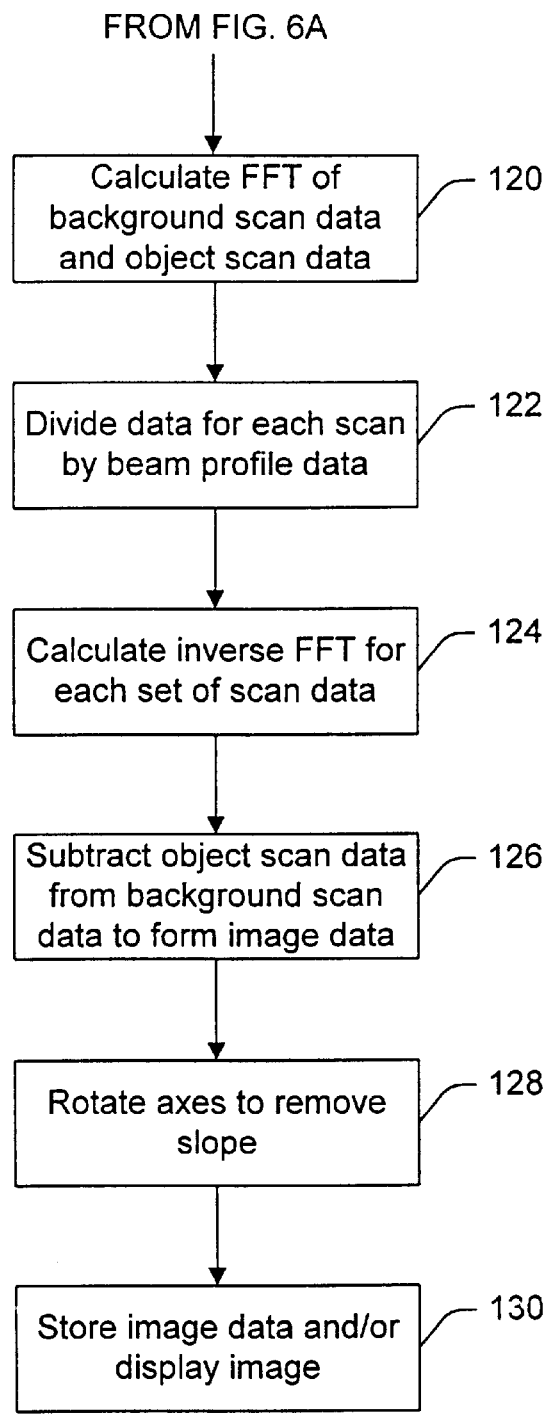

FIGS. 6A and 6B show a flowchart for control of the optical microscope. The computer can implement this flow, e.g., by executing program instructions loaded into RAM from a fixed disk, a floppy disk, or a CD-ROM. The system begins by prompting the user to place an "empty" sensor into the microscope and awaiting a "start" command, such as a predefined keystroke or mouse click, from the user (step 100). When the user provides the start command, the piezo-ceramic stage is actuated to place the fiber in a default start position (step 102), and the laser is illuminated (step 104). The computer obtains the corresponding values of $I_B(x)$ and $I_B(Y)$ from the sensor (step 106) and then adds the values and stores the result, along with data indicating the beam position (step 108). The stage then moves the fiber to the next position (step 110), and the computer determines whether this position signifies the end of the "background"

scan (step 112). If not, the system again reads and stores the values of $I_B(x)$ and $I_B(y)$ (steps 106 and 108) and increments the position of the fiber (step 110), continuing in this manner until the background scan is complete.

When the background scan is complete, the system shuts off the laser (step 114) and then determines whether the object scan has been performed (step 116). If not, the system prompts the user to place the object on the sensor and then awaits the start command (step 118). After receiving the start command, the system repeats the process above (steps 102–114) until the object scan is complete.

Upon completing the object scan, the computer begins processing the data gathered during the background and object scans to create raster image data. First, the computer processes the data to remove effects caused by the Gaussian $TEM_{00}$ profile of the light beam. To do so, the computer performs fast Fourier transforms (FFT) on the background scan dataset and object scan dataset to form background scan FFT data and object scan FFT data (step 120). The computer then divides both the background scan FFT and the object scan FFT by the Gaussian beam profile to form corrected FFT data for each dataset (step 122). The computer then performs an inverse FFT on each set of corrected FFT data to form a beam-corrected background scan dataset and a beam-corrected object scan dataset (step 124).

After correcting the background scan and object scan datasets, the computer performs a pixel-by-pixel subtraction of the beam-corrected object scan dataset from the beam-corrected background scan dataset to form raster image data (step 126). The computer then processes the raster image data to remove the linear slope inherent in the data, as discussed above (step 128). The computer stores the slope-corrected image data in a storage device, such as a fixed or floppy disk, and/or uses the data to display an image of the object (step 130). The image data, when displayed, appears as a topographic image of the sensor's surface, with "empty" portions of the surface appearing at the lowest elevations and areas covered by the object appearing as "peaks".

While the optical microscope has been described to include a programmable computer, the microscope's control and processing electronics may be implemented in many ways, including in digital electronic circuitry or in computer hardware, firmware, software, or in combinations of them. Apparatus embodying the invention may be implemented, in part, in a computer program product tangibly embodied in a machine-readable storage device for execution by a computer processor; and methods embodying the invention may be performed by a computer processor executing instructions organized, e.g., into program modules to carry out the invention by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the following claims. For example, while the "background" and "object" scans have been described as occurring in linear rows, the microscope could, e.g., first scan the periphery of the gap in the sensor and then "spiral" toward the center of the sensor. The light emitted from the fiber may vary in wavelength, e.g., from the upper-UV wavelengths through the visible spectrum. Also, the proximity of the fiber to the sensor may vary and, in some embodiments, the fiber may be positioned outside the near-field. Furthermore, while the description above assumes that the object shields portions of the sensor from substantially all light, the microscope may be used to image objects that reduce but do not block entirely the incidence of light on the sensor. Moreover, a photosensor using technology other than MSM diodes may be used.

What is claimed is:

1. An optical microscope for use in creating an image of an object, the optical microscope comprising:
    a photosensor having a semiconductor surface responsive to light and at least one pair of contacts on said semiconductor surface spaced from each other to produce an output signal indicating a light-induced signal produced by said semiconductor surface in response to said light, an area between said pair of contacts forming a sample-holing surface to hold an object to be imaged;
    a light source operable to produce a beam of light;
    an actuator coupled to the light source to scan the beam of light relative to the sample-holding surface to cause a photo response in the sample-holding area as a function of scanning positions; and
    processing circuitry coupled to the contacts to receive the output signal and configured to:
        receive a background scan signal from the contacts when the beam of light strikes the sample-holding area during a background scan conducted without the object placed on the surface;
        create a background scan dataset indicating a value of the background scan signal at each of scanning positions on the sample-holding area;
        receive an object scan signal from the contacts when the beam of light strikes the sample-holding area during an object scan conducted with the object placed on the sample-holding area;
        create an object scan dataset indicating a value of the object scan signal at each of the scanning positions on the sample-holding area; and
        derive image data from the background scan dataset and the object scan dataset to create an image of the object.

2. The optical microscope of claim 1, in which the processing circuitry is configured to subtract the object scan dataset from the background scan dataset to derive the image data.

3. The optical microscope of claim 1, in which the beam of light has a known beam profile and the processing circuitry is configured to process the background scan dataset and the object scan dataset to account for the beam profile.

4. The optical microscope of claim 3, in which the processing circuitry is configured to deconvolve the beam profile from the background scan dataset and the object scan dataset.

5. The optical microscope of claim 1, in which the processing circuitry is configured to receive an additional background scan signal during the background scan and an additional object scan signal during the object scan.

6. The optical microscope of claim 5, further comprising another pair of contacts on the semiconductor surface across the sample-holding area aligned in a different direction from a direction of the pair of contacts in which the background scan signals indicate motion of the light beam in two different directions of the pairs of contacts over the sample-holding surface during the background scan.

7. The optical microscope of claim 5, in which the object scan signals indicate motion of the light beam in two different directions over the surface during the object scan.

8. The optical microscope of claim 5, in which the processing circuitry is configured to add the background scan signals before creating the background scan dataset and to add the object scan signals before creating the object scan dataset.

9. The optical microscope of claim 1, further comprising a fiber connected to the light source to deliver the beam of light to the surface on which the object is to be placed.

10. The optical microscope of claim 9, in which the fiber is positioned so that the surface lies in the near-field of the light emitted by the fiber.

11. The optical microscope of claim 1, wherein each of the contacts is formed of a metal and the pair of contacts and the sample-holding surface form a metal-semiconductor-metal photodiode.

12. The optical microscope of claim 1, in which the photosensor includes includes light-transmitting passivation layer over the sample holding surface.

13. The optical microscope of claim 12, in which the passivation layer includes an oxide or nitride film.

14. The optical microscope of claim 1, wherein the processing circuitry is operable to remove a distortion in the image caused by a dependence of the output signal on the position of illumination that is independent of the presence of the object.

15. An optical microscope for use in viewing an object, the optical microscope comprising:
    a photosensor having a semiconductor surface on which the object is to be placed, the semiconductor surface being responsive to a beam of light to produce an electrical output indicating a spatial profile of the object which blocks or attenuates an amount of light to reach the semiconductor surface compare to an area without the object;
    a light source operable to produce the beam of light;
    an actuator coupled to the light source to scan the beam of light over multiple positions on the semiconductor surface of the photosensor;
    processing circuitry coupled to receive the electrical output produced by the semiconductor surface and configured to:
    receive two background scan signals from the photosensor when light from the beam strikes the semiconductor surface of the photosensor during a background scan conducted without the object placed on the semiconductor surface, the background scan signals indicating motion of the beam of light in two different directions over the semiconductor surface;
    add the two background scan signals to form a combined background scan signal;
    create a background scan dataset indicating a value of the combined background scan signal at each of multiple positions on the semiconductor surface of the photosensor;
    receive two object scan signals when light from the beam strikes the semiconductor surface of the photosensor during an object scan conducted with the object placed on the surface, the object scan signals indicating motion of the beam in two different directions over the semiconductor surface;
    add the two object scan signals to form a combined object scan signal;

create an object scan dataset indicating a value of the combined object scan signal at each of the multiple positions on the semiconductor surface of the photosensor;

deconvolve a known profile of the light beam from the background scan dataset and the object scan dataset to form a beam-corrected background scan dataset and a beam-corrected object scan dataset; and subtract the beam-corrected object scan dataset from the beam-corrected background scan dataset to create an image dataset for use in creating the image of the object; and a display device configured to display the image of the object.

16. A method for use in creating an image of an object in an optical microscope, the method comprising:

scanning a beam of light over a photosensitive surface on which the object is to be placed to generate a photo-induced output signal as a function of multiple scanning positions;

receiving a background scan signal when the light strikes the surface without the object in place;

after the object has been placed on the surface, again scanning the beam of light over the surface;

receiving an object scan signal when the light strikes the surface with the object in place;

creating a background scan dataset indicating a value of the background scan signal at each of multiple positions on the surface;

creating an object scan dataset indicating a value of the object scan signal at each of the multiple positions on the surface; and deriving image data from the background scan dataset and the object scan dataset for use in creating the image of the object.

17. The method of claim 16, in which deriving the image data comprises subtracting the object scan dataset from the background scan dataset.

18. The method of claim 16, further comprising processing the background scan dataset and the object scan dataset to account for a known beam profile of the light beam.

19. The method of claim 18, wherein processing the background scan dataset and the object scan dataset comprises deconvolving the beam profile from each of the datasets.

20. The method of claim 16, further comprising receiving an additional background scan signal before the object is placed on the surface and an additional object scan signal after the object is placed on the surface.

21. The method of claim 20, in which the background scan signals indicate motion of the light beam in two different directions over the surface without the object in place.

22. The method of claim 20, in which the object scan signals indicate motion of the light beam in two different directions over the surface with the object in place.

23. The method of claim 20, further comprising combining the background scan signals before creating the background scan dataset and combining the object scan signals before creating the object scan dataset.

24. The method of claim 16, further comprising delivering the beam of light to the surface through a fiber connected to the light source.

25. The method of claim 24, further comprising positioning the fiber so that the surface lies in the near-field of the light emitted by the fiber.

26. The method of claim 16, wherein the surface comprises a semiconductor surface of a photosensor.

27. The method of claim 26, in which the photosensor includes an MSM diode.

28. The method of claim 26, in which the photosensor includes two MSM diodes.

29. The method of claim 16, further comprising displaying the image on a display device.

30. An imaging device, comprising:

a substrate formed of a semiconductor material responsive to light to produce an electrical signal and having a sample surface on which a sample is to be placed;

at least one pair of electrical contacts formed on said substrate and spaced from each other across said sample surface to receive and output said electrical signal;

an optical fiber probe to receive and guide an optical probe beam to illuminate said sample surface for generating said electrical signal;

a scanning element to scan said fiber probe over said sample surface to illuminate multiple scanning positions on said sample surface; and a processing circuit coupled to said electrical contacts to receive said electrical signal and operable to extract imaging information of the object placed on said sample surface from said electrical signal.

31. The device as in claim 30, wherein said processing circuit is operable to compare an object scan in said electrical signal when the object is placed on said sample surface to a background scan in said electrical signal when the object is not placed on said sample surface, and to generate said imaging information of the object from said comparison.

32. The device as in claim 30, wherein each of said electrical contacts is a Schottky-barrier contact.

* * * * *